Nov. 27, 1945.  C. E. REED ET AL  2,389,931
METHOD FOR PRODUCING ORGANO-SILICONHALIDES
Filed Sept. 27, 1943  2 Sheets-Sheet 2
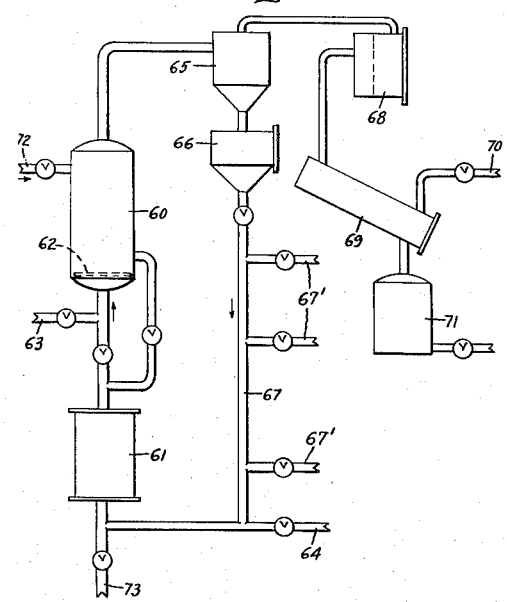
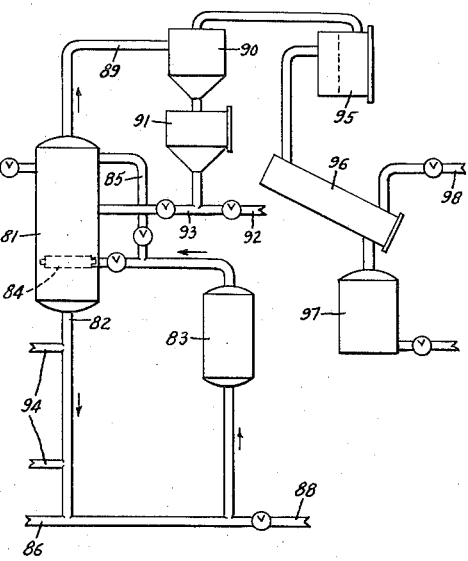
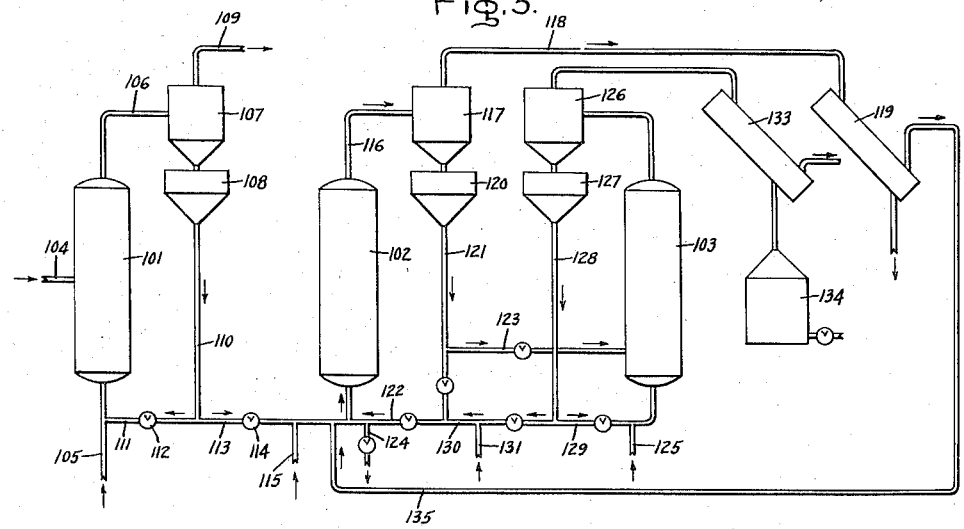
Inventors:
Charles E. Reed,
Jerome T. Coe,
by Harry E. Dunham
Their Attorney.

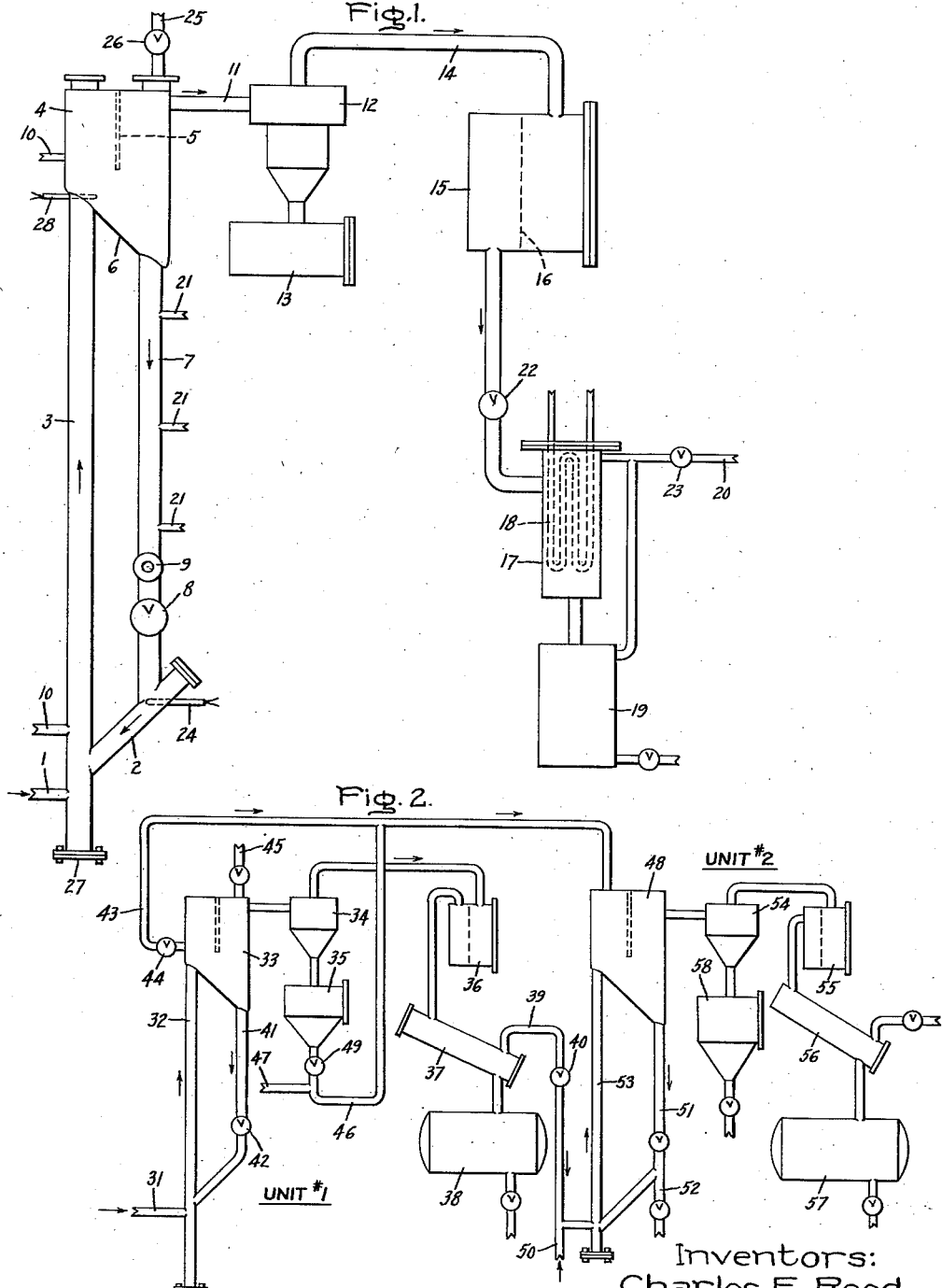

Patented Nov. 27, 1945

2,389,931

UNITED STATES PATENT OFFICE 2,389,931

METHOD FOR PRODUCING ORGANO-SILICONHALIDES

Charles E. Reed, Schenectady, and Jerome T. Coe, Fort Schuyler, N. Y., assignors to General Electric Company, a corporation of New York Application September 27, 1943, Serial No. 504,674

11 Claims. (Cl. 260—607)

The present invention relates to a method for the preparation of organo-silicon compounds. It is particularly concerned with the production of organo-silicon halides from powdered or finely divided silicon and hydrocarbon halides.

The preparation of organo-silicon halides by contacting hydrocarbon halides with a mass of silicon is described and broadly claimed in the copending application of Eugene G. Rochow, Serial No. 412,459, filed September 26, 1941 and assigned to the same assignee as the present invention. The products of the reaction may comprise any or all of the various organo-silicon halides of the general formula $R_nSiX_{4-n}$ wherein R represents an alkyl, aryl, aralkyl, or alkaryl radical, X represents a halogen atom, and n is equal to 1, 2, or 3, along with various other silicon compounds such as silicon tetrahalide, tetraorgano silane and mono-organo dihalogenosilane. The reaction between the silicon mass and the hydrocarbon halides is highly exothermic and unless the heat of reaction is promptly removed, the reaction temperature will rise at an ever accelerating rate. The immediate result of an uncontrolled increase in the temperature of the reaction mass is the formation of more of the less desirable tri- and tetra-halides and an undesirable deposition of carbon on the silicon mass. As the rate of reaction is markedly dependent upon the extent of the surface presented by the solid silicon reactant, it is desirable to use this reactant in the finely-divided or powdered state. However, because of the very low thermal conductivity of silicon powder and the relatively low heat capacity of the gaseous reaction products, the removal of heat of reaction from the interior of a stationary mass of the silicon reactant at a rate sufficient to control the reaction temperature is extremely difficult.

The present invention is concerned primarily with a method for carrying out the reaction between a hydrocarbon halide and silicon powder whereby the temperature of the silicon reactant may be readily controlled to produce the desired reaction products. The nature of the invention will be readily understood from the following description thereof taken in connection with the accompanying drawings wherein Figure 1 diagrammatically shows one form of apparatus in which the method may be operated, and Figures 2-5 show various modified apparatus involving the operating principles of the apparatus shown in Fig. 1.

Briefly described, the present invention in its preferred form comprises contacting a hydrocarbon halide with the silicon reactant in finely-divided or powdered form under conditions of violent agitation with provision for removing hot, unreacted silicon powder from the reaction zone, cooling it, and reinjecting cooled powder into the reaction zone in such quantity as to absorb the high heat of reaction and effect precise control over the reaction temperature. The movement and agitation of the powder in the reaction zone and tne circulation of the powder through a cooling zone is accomplished by non-mechanical, fluid-dynamical means.

The invention will be described with particular reference to the preparation of methyl silicon chlorides by reacting methyl chloride with silicon. It is to be understood however that it is not limited thereto but is broadly applicable to the reaction of powdered silicon with other organic compounds such as other hydrocarbon halides or alcohols. Thus it may be employed in the preparation of other alkyl silicon halides, (e. g. ethyl, propyl, butyl, amyl, isoamyl, hexyl, etc., silicon halides), the aryl silicon halides (e. g., phenyl silicon halides, etc.), the aryl-substituted aliphatic silicon halides (e. g., phenylethyl silicon halides, etc.), and the aliphatic-substituted aryl silicon halides (e. g., tolyl silicon halides, etc.), mixed silicon halides (e. g., methyl ethyl silicon halides, ethyl phenyl silicon halides, etc.), alkylene silicon halides (e. g. the ethylene silicon chlorides described and claimed in copending application Serial No. 433,328 Patnode and Schlessler, filed March 4, 1942, and assigned to the same assignee as the present invention) and in the production of organo silicates such as methyl silicate from methyl alcohol and silicon powder. It is to be understood that the powdered silicon reactant may be pure silicon or a powdered mixture (or alloy) of silicon and a catalyst or solid diluent, all of which are intended to be covered by the terms "silicon powder" or "powdered silicon" as used hereinafter and in the appended claims.

Referring to Fig. 1, a reactive gas, such as methyl chloride is introduced into the apparatus through inlet pipe 1, flows upward and meets a stream of silicon powder flowing down inclined leg 2. The gas fluidizes the powder and the resultant mixture ascends through upright reactor tube or vessel 3 to a separatory chamber or head 4 having a larger cross-sectional area than tubular reactor 3. In separatory chamber 4, most of the unreacted silicon powder is disengaged from the unreacted methyl chloride and the gaseous products of reaction formed in reactor 3 (and to some extent in separatory chamber 4) since the gas velocity in chamber 4 is almost negligible as compared with the gas velocity in reactor 3. A baffle 5 may be provided to aid in the separation. If desired, a more efficient separation of the powder may be obtained by designing this portion of the apparatus along the lines of a cyclone separator. The separated powder collecting on the inclined floor 6 of chamber 4 flows into vertical return pipe 7, the lower end of which is connected to inclined leg 2. Pipe 7 functions as a cooling chamber or vessel for the dissipation of the heat of reaction absorbed by the silicon powder. In operation of the apparatus, pipe 7 down to valve 8 is ordinarily filled with a relatively solid mass of powder having a bulk density of 65–80 pounds per cubic feet and control over the downward flow of this powder is exercised by means of valve 8. The velocity of downward flow of powder may be observed through sight glass 9. The fluidized mixture of powder and gas ascending reaction tube 3 has a bulk density varying from 3–40 pounds per cubic foot depending upon the rate at which methyl chloride enters through 1 relative to the rate at which powder is throttled through valve 8 and on the density of the gas phase under any particular set of conditions. The pressure drop measured across reactor tube 3 by means of pressure taps 10 is due almost entirely to the weight of fluidized silicon powder flowing up 3, the friction drop due to flow being almost negligible compared to this potential head. Since the effective pressure produced by the column of powder above valve 8 exceeds the pressure at the bottom of 3, relatively high bulk density powder flows down tube 7 and powder dispersed in gas to a lower bulk density flows up tube 3. The result is a continuous circulation of silicon powder through a closed cycle comprising a reaction chamber, a separator chamber and a cooling chamber. Practically the entire quantity of methyl chloride admitted through 1 flows up tube 3 due to the relatively lower density of the powder contained therein and hence reaction occurs largely in this zone. As was previously stated, a certain amount of reaction may in some cases occur in chamber 4. Reaction products carrying small quantities of unseparated silicon powder flow from the reaction head through conduit 11 and enter cyclone separator 12 where a major portion of any silicon powder entrained is dropped out into receiver 13. From cyclone separator 12 the reaction products flow through transfer line 14 into filter 15 where residual fine silicon dust is removed by filter cloth 16. The reaction products finally pass to condenser 17 provided with cooling coils 18 where the products are wholly or partially condensed. The condensate is collected in receiving drum 19. Any non-condensible vapors are vented from the system through exhaust line 20. The downward flow of powder through return tube 7 may be aided by injection of small quantities of methyl chloride or other suitable gas, such as nitrogen, through lines 21. Such gas also serves to purge the powder of reaction products and thereby permits the use of much lower cooling temperatures in this tube without condensation of any entrained product vapor to liquid, which condensation might produce a pasty condition that would interfere seriously with the flow of an otherwise fluid powder. The system may be maintained under sub- or super-atmospheric pressure either up to or including condenser 17 and receiver 19 by means of valves 22 or 23.

Reaction tube 3, its contents, and reactor head 4 are initially raised to reaction temperature for example by means of electric heating elements (not shown) wound around reactor 3 and inserted into or wound around head 4 and the chemical reaction in these portions of the apparatus may be conducted with no gain or loss of heat through the walls. As the weight ratio of the silicon powder to methyl chloride flowing through tube 3 is, for example, of the order of one hundred to one, the temperature rise in this section of the apparatus resulting from liberation of reaction heat is very moderate and can be almost completely eliminated by suitable modifications in design which make possible the unique combination of an adiabatic reactor operating substantially isothermally. By this arrangement, the heat of reaction is removed from the reaction chamber in very positive fashion at a controlled temperature level by means of a circulating powder which is itself one of the reactants. This type of apparatus also permits heat to be removed as sensible heat in an inert gas mixed in with the methyl chloride or a combination of the two methods may be employed. The temperature of silicon powder flowing to inclined pipe 2 is measured by thermocouple 24. The thermocouple can also act as the detecting element for a controller (not shown) which will control wall temperatures in tube 7 and hence the quantity of reaction heat dissipated from the system. Fresh silicon powder is blown into the reactor through line 25 provided with valve 26 and the spent powder is removed at the end of the run through the bottom of tube 3 which is normally closed by cap 27.

One of the outstanding advantages of carrying out the reaction between silicon and methyl chloride in this manner resides in the fact that the positive temperature control and dissipation of reaction heat thereby obtained makes practical the construction of large capacity units which may be operated with highly reactive, finely powdered silicon at high efficiency with low labor costs. The intense turbulence in reactor tube 3 provides an unusually effective contact between silicon powder and gas desirable in a heterogeneous reaction and minimizes lateral temperature gradients and hot spots. Since it is unnecessary in this type of apparatus to remove heat directly from the reaction zone, there are no theoretical limits on the diameter of the reaction vessel comprising this zone. The sensible heat from the circulating powder is absorbed in a separate heat exchanger 7 in which the temperature of the cooling surface may be much lower than if it were in the reactor proper where too cool a surface will lower reaction rate to uneconomical levels. The rapid circulation and agitation of powder insures the same treatment for every grain of powder at every stage of the reaction and unlike a static bed reactor where the state of the silicon powder unavoidably varies from top to bottom, optimum conditions for the entire charge may be maintained at all times in the reaction zone.

It is also possible to increase the rate of reaction in apparatus of the type disclosed herein by operating under pressure without experiencing any localized overheating. When pressure operation is employed, it is also possible to lower reaction temperatures and at the same time obtain equal or higher yields of dimethyldichlorosilane. Operation under only moderate pressure, for example, a pressure of 80 lbs., presents the further advantage of permitting total condensation of the reaction products including any unreacted methylchloride at ordinary cooling water temperatures, followed by a low cost stripping operation and recirculation of the unreacted methyl chloride.

The exact design and operation of the methyl chloride-silicon converter and the use therewith of means for recovering and recirculating unreacted methyl chloride is dependent on economic considerations. The reactor may be designed for high conversion per pass of methyl chloride by provision for an increased time of contact of the methyl chloride with silicon (e. g., by use of an elongated reaction chamber). Such increased conversion per pass will be realized however at the expense of lowered production capacity per unit volume of reactor due to the lower average rate of reaction resulting from the lower average partial pressure of methyl chloride. On the other hand, the use of a shorter reactor tube will result in a lower conversion per pass and higher average rate of production of methylchlorosilanes per unit volume of reactor, but will require a larger recovery system and a greater methyl chloride recirculation. Hence, the optimum size of the apparatus will depend on the desired products, cost of various pieces of equipment, and operation thereof.

For small scale production, exceptionally good results have been obtained with fluid dynamic apparatus in which the reaction tube 3 was 1.5 inches diameter and 32 feet long, the cooling return tube 7 two inches in diameter and 29 feet long, and the separatory head 4 sixteen inches in diameter. The distance from powder return tube entrance to top of separatory chamber along floor 6 was 3.0 feet. The reactor, cyclone separator, and filter were operated under a pressure of 40–50 lbs. gage. Methyl chloride at room temperature was fed into reactor tube 3 through entrance tube 1 at a rate of 12–15 lbs./hr. The apparatus was charged with a mixture of 90 per cent silicon and 10 per cent copper fired for two hours at 1050° C. and thereafter crushed to 60–100 mesh. The temperature of powder returning through tube 2 as measured on thermocouple 24 was 330–340° C. and temperature of powder entering reaction head 4 as measured by thermocouple 28 was 360–370° C. These temperatures are believed to represent very closely the actual reaction zone temperatures since the violence of the turbulence throughout the reaction zone and in the vicinity of the thermocouples results in a thorough mixing of the powder and positively eliminates the existence of any local hot spots. Pressure on the system was maintained by throttle valve 22 and the product was collected from water condenser 17 in receiver 19. The reactor was charged with powder at the start of the run and several times during the run through pipe 11. All lines, cyclones, filters, etc., were maintained at a sufficiently high temperature to prevent premature liquefaction of any of the reaction products. Over a 24-hour period the average rate of production of total reaction product was 9.4 lbs./hr. and the average distillation analysis of the product showed it to contain about 57 per cent dimethyldichlorosilane. The average dimethyldichlorosilane content of the products obtained from static bed reactors is generally considerably less than 50 per cent.

A convenient basis for comparison of the production capacity of different types of reactors is the index: lbs. of product produced per hr. per cubic ft. of superficial reactor volume. This value for the 24 hr. run outlined above is 20.9. It may be compared with that of 0.57 for a static bed reactor 4" internal diameter and 8 ft. long and 3.6 for a static bed reactor 1.5" internal diameter and 6 ft. long. The use of longer static reactor tubes would result in a decrease in these values due to the overall lower partial pressure of methyl chloride.

It is obvious that the output of apparatus of this invention is roughly proportional to the effective reactor volume. Since the diameter of the reaction tube and the operating pressure may both be increased without losing control over reaction temperature, single units of large capacity and low operating cost may be used. The maximum size, particularly the maximum diameter, of static reactor tubes is definitely limited due to the problem of controlling the reaction temperatures within such tubes.

In Figure 2 there is shown apparatus comprising two of the fluid-dynamic reactors of the type shown in Fig. 1 operating in cascade. More than two reactor units may also be operated in this manner. In the operation of this type of apparatus as applied for example to two units, unit No. 1 preferably operates at a higher pressure than unit No. 2. For example, No. 1 may operate at 50 lbs. bottom pressure and 45 lbs. head pressure and No. 2 at 35 lbs. bottom pressure and 30 lbs. head pressure, so that it is possible for a gaseous dispersion of powder to flow from the head of No. 1 at 45 lbs. to the head of No. 2 at 30 lbs. In operation of this type of apparatus, fresh methyl chloride is introduced through inlet 31 into the bottom of tubular reaction chamber 32 of unit No. 1. The gaseous products from the reaction chamber are separated from most of the silicon in the separatory chamber 33 and then enter cyclone separator 34 where substantial part of the remaining powder entrained in the gas drops into receiver 35. The fine powder still entrained in the reaction products is removed by filter 36 before the products enter condenser 37 which is operated at a temperature suitable for condensing and separating the methylchlorosilanes and other high boiling products from the unreacted methyl chloride. The condensate collects in receiver 38 while the uncondensed methyl chloride flows to the bottom of unit No. 2 through pipe 39 provided with a valve 40 for controlling the flow.

The silicon powder collecting in header 33 flows into cooling tube 41 provided with control valve 42. The operation and construction of this portion of unit 1 are similar to the corresponding portion of the apparatus shown in Fig. 1.

Partially used silicon powder is continuously or intermittently purged from header 33 through conduit 43 provided with control valve 44 and the purged powder is replaced by fresh silicon powder introduced through pipe 45. The purged powder is carried through the conduit by means of part of the reaction products formed in unit No. 1. This mixture of reaction products and powder is combined with the silicon powder collecting in receiver 35 and purged therefrom through pipe 46 by means of a stream of methyl chloride or other suitable gas introduced through pipe 47 and is introduced into separatory chamber 48 of unit No. 2. Valve 49 in pipe 46 regulates the flow of powder from the separator.

The structure and operation of the unit No. 2 is substantially the same as unit No. 1. Fresh methyl chloride is added to the uncondensed methyl chloride from unit No. 1 through pipe 50 and the spent powder is periodically or continually purged from the lower end of cooling tube 51 through line 52 at a rate sufficient to compensate for the powder introduced into unit No. 2 through conduit 43.

The reaction products formed in reactor 53 or entering unit No. 2 from conduit 43 leave the separatory chamber of unit No. 2 and flow successively to cyclone separator 54, filter 55, and condenser 56 which is operated at a temperature sufficiently low to totally condense all of the reaction products and the unreacted methyl chloride. The condensate from receiver 57 may then go to a stripping column from which methyl chloride is taken as overhead product to be eventually recirculated to the reactors. The silicon powder removed by separator 54 is collected in receiver 58.

Due to the rapid circulation of powder within the apparatus, any powder purged from either unit possesses the same degree of conversion and condition as powder reacting within the unit. Inasmuch as the reactivity of all types of powdered silicon, silicon mixtures, alloys, etc., appears to decrease as the per cent of the original silicon converted increases, the production capacity of any unit decreases as the average per cent conversion of the silicon powder within the unit increases. In order to operate a single unit continuously, it is desirable to bleed off reacted powder either continuously or intermittently at a point in the reactor sufficiently far removed from the point of introduction of fresh powder so that the latter has time to become thoroughly mixed with the reactor contents. Under such circumstances it is necessary to strike a balance between the desirability of high production capacity and high conversion of silicon and there will be an optimum average per cent conversion of silicon at which it will pay to operate a single unit of any given volume. By operating several units in series, the first unit will operate more efficiently than each succeeding unit in which a silicon powder of a higher average per cent conversion is used. The last unit in the series will operate with the least reactive silicon, and so-called spent powder may be drawn off from this unit. Such operation is, on the powder side, equivalent to stepwise operation and results in an overall operation at a higher average production rate with a higher average conversion of silicon. The number of units which can be economically operated in such a cascade arrangement will depend upon a balance of fixed charges and operating costs. In the two stage reactor system shown in Fig. 2, the condenser 37 separates reaction products from unreacted methyl chloride and hence increases the effective partial pressure of methyl chloride in unit No. 2 over the value which would result if the entire gaseous effluent from No. 1 were to be fed directly to the bottom of unit No. 2.

The reactors need not take the exact form illustrated in Figures 1 and 2. The same general principle is embodied in the modification illustrated in Fig. 3. In this modification, the reactor consists of an enlarged cylindrical vessel 60 in which mixing and agitation of gas and powder is made sufficiently violent that temperature gradients are negligible both longitudinally and laterally. The heat of reaction is absorbed by the cold powder flowing to reactor 60 from cooler 61. The cold powder may be introduced either into the side of the reactor or into the bottom thereof through distribution plate 62. Methyl chloride is introduced through pipe 63. Even though the cold powder may enter the reaction chamber at a temperature far below that prevailing throughout the chamber, mixing of the fresh fluidized powder with that already in the vessel is so effective that the fresh powder is quickly heated to chamber temperature, the heat required for this purpose being abstracted from the rest of the powder, thereby providing the desired cooling effect. If desired liquid methyl chloride, liquid methylchlorosilanes, or any other suitable liquid may be injected through pipe 64 into the stream of powder flowing through the cooler and use thereby made of its latent heat in absorbing part of the heat of reaction. Water is an example of an unsuitable liquid for this purpose since it will react with any methylchlorosilane vapors present. Hot fluidized powder and gaseous reaction products flow from the chamber 60 to cyclone separator 65 where the major portion of entrained powder is removed and dropped into receiving hopper 66 from which it flows through conduit 67 to cooler 61 and back to reactor 60. If necessary, a fluidizing gas may be introduced into conduit 67 through lines 67'. Final traces of powder are removed from the reaction products in filter 68. If necessary, the products may also be passed through an electrostatic precipitator (not shown) before entering condenser 69. It may also be desirable in some cases to precondense a portion of the vapors in order to wet, and therefore aid in the precipitation of, any powder still uncollected at this point. It is also possible to scrub the gases at this point with total condensate or any other suitable liquid to effect final removal of powder. The system preferably is operated under such a pressure and condenser 69 at such a temperature that total condensation of reaction products and unreacted methyl chloride takes place in the condenser. Non-condensibles are exhausted from the condenser through line 70. The condensate collected in receiver 71 may be treated in a stripping column where the unreacted methyl chloride is removed and returned to the system. Fresh silicon powder is charged to the system through line 72 and spent powder discharged from the system through 73. Like the previous modifications, this reactor may be operated either semi-batchwise or continuously. In semi-batchwise operation the system is charged with a suitable amount of powdered silicon or a powdered mixture of silicon and a catalyst, brought up to temperature, and placed on stream with a hydrocarbon halide. As the mass of solid silicon powder decreases, additional silicon powder is introduced at appropriate intervals. When the reactivity of the powder within the system reaches an uneconomically low level, the entire contents of the system are discharged and the cycle repeated. It is also possible to charge this once reacted powder to a second unit in accordance with the principle used with the modification of Fig. 2 where its effective reactivity may be increased by treatment with methyl chloride under more drastic conditions of temperature (and pressure if the second unit is operated independently at a higher pressure) resulting in a further conversion of the silicon to methylchlorosilanes. Ordinarily the reaction products from such a secondary treatment will contain a large quantity of trichloromonomethylsilane and relatively smaller quantities of dimethyldichlorosilane.

In continuous operation the system is charged with powder, placed on stream with methyl chloride, and the powder within the system allowed to reach a certain optimum level of conversion at which time fresh powder is continuously charged into the system and spent powder is continuously removed. It is also possible to charge fresh powder intermittently and to purge spent powder intermittently. The disadvantages of both the continuous and intermittent systems may be overcome by operating two or more reactors of the Fig. 3 type in cascade arrangement as described in connection with the apparatus of Fig. 2.

The reaction between a hydrocarbon halide such as methylchloride and silicon is believed to involve (1) diffusion of the reactant gas up to the active surface; (2) chemical reaction on the surface and perhaps to some extent in the gas phase in the immediate vicinity of the surface, and (3) diffusion of reaction products away from the surface. Depending on the degree of adsorption of any specific reaction products on the silicon surface, it may be advantageous to subject the circulating powder to thorough purging at an appropriate point within its cycle by blasting it with methyl chloride from high velocity jets. The purging may be done, for example, either at the entrance or exit to the cooling chamber.

In the modification illustrated in Figure 4 the silicon powder is drawn off from the bottom of the reactor for circulation to the cooler. As illustrated, this modification comprises an enlarged cylindrical reaction vessel 81 from which the silicon powder is drawn off through line 82 to a cooler 83 from which it flows back into the reactor 81 either through a centrally located distributor plate 84 or into the top of the reactor through conduit 85. Fresh methyl chloride, which fluidizes and circulates the silicon powder, is introduced into the system between the reactor and the cooler through pipe 86 while fresh silicon powder is introduced directly into the reactor through inlet 87 and spent or partially reacted powder removed from the system through outlet 88 located near the inlet end of cooler 83. No condensation of the reaction products adsorbed on the circulating silicon powder takes place in the cooler because of the fact that the partial pressure of these reaction products is small due to dilution thereof with fresh methyl chloride introduced into the system ahead of the cooling chamber. The reaction products are removed from the reactor through conduit 89 and are carried through cyclone separator 90 where most of the silicon powder is separated from the gaseous reaction products. The silicon powder collects in hopper 91 and may be either removed from the system through pipe 92 or returned to the reactor through conduit 93. If desired, fluidizing gases such as methyl chloride, hydrogen, and nitrogen may be introduced at various points to aid in the circulation of the silicon powder. In the apparatus shown in Figure 4 two such points are indicated by numeral 94. The remaining portion of this apparatus comprising filter 95, condenser 96, receiver 97, and exhaust 98 operates in substantially the same manner as the corresponding portion of the apparatus disclosed in Fig. 3.

The bottom drawoff of powder from the hopperlike bottom of reactor 81 facilitates the circulation of large quantities of powder relative to the methyl chloride being used. It will be apparent that it is possible to operate this modification semibatchwise by the method of continuous or intermittent charge or discharge, or a plurality of such units may be operated on the dual or multiple cascade principle referred to hereinbefore.

Certain types of contact masses comprising silicon and a metal or metal oxide catalyst may profitably be subjected to a pretreatment which renders them more active toward a hydrocarbon halide such as methyl chloride. Depending on the particular silicon-catalyst combination employed, such treatments may comprise controlled oxidation with air, steam, carbon dioxide, or other suitable oxidizing gas, chlorination with chlorine gas, treatment with hydrogen chloride gas, reduction with hydrogen, or special treatment with some other suitable gas or gases. Such treatment may be conducted advantageously in apparatus operating either as a separate unit or in continuous or intermittent connection with a reactor in which methyl chloride is contacted with silicon. Partially converted silicon powder of lowered reactivity may frequently be reactivated by treatment with hydrogen gas, chlorine gas, hydrogen chloride gas or hydrogen fluoride gas, or some other suitable gas and such a reactivation treatment may be conducted advantageously in apparatus operating either as a separate unit or in continuous or intermittent connection with the reactor in which methyl chloride is contacted with silicon.

A method of pretreating and reactivating silicon powder compositions and apparatus suitable for carrying out the method is illustrated in Figure 5. Three reaction vessels 101, 102, and 103 are illustrated. These reactors may be operated as a continuous or intermittent flow battery. For example, a copper-silicon sintered powder or alloy may be introduced into reactor 101 through inlet 104 and be subjected there to a controlled oxidation with air introduced into the bottom of the reactor through pipe 105. Any suitable heating means (not shown) may be used to heat the contents of the oxidation reactor 101. The oxygen-treated powder is removed through pipe 106 and is carried thereby to a cyclone separator 107 where it is separated from the treating gas and drops into hopper 108. The treating gas is exhausted in the cyclone separator through pipe 109 while the powder is discharged from hopper 108 through pipe 110. All or part of the powder may be recirculated to the reaction chamber 101 through pipe 111 provided with control or throttle valve 112 or part or all of the powder may be intermittently or continuously carried to methyl chloride reactor 102 through pipe 113 provided with the throttle or control valve 114. An inlet 115 for methyl chloride gas is provided in conduit 113 between the control valve and reactor 102. Reaction products from reactor 102 along with the silicon powder, and catalyst, if such is present, pass from reactor 102 through conduit 116 to cyclone separator 117. The reaction products are conveyed through conduit 118 to a condenser 119 and are thereafter handled in the manner described in connection with apparatus shown in Figs. 1, 2, 3, and 4. Part or all of the silicon powder collecting in hopper 120 below the separator 117 is either continuously or intermittently recirculated through conduit 121 and 122 to reactor 102 or conducted through pipe 121 and 123 to the third reaction chamber 103. Numeral 124 indicates a drawoff line for removing powder from the system.

In reactor 103 powder is subjected to reactivation treatment, for example, by treatment with hydrogen chloride gas introduced through pipe 125. The reactivated powder is separated from the treating gas in cyclone separator 126 and the separated powder collecting in hopper 127 may be either continuously or intermittently recirculated through reactor 103 through pipes 128 and 129 or may be continuously or intermittently conducted through pipes 128, 130 and 122 to reactor 102. Preferably the powder is purged of all reactivating gas, for example, in or below hopper 127 before being returned to reactor 102. If necessary, methyl chloride in an amount sufficient to "gasify" or fluidize the circulating powder may be introduced into conduit 130 through pipe 131. The gaseous products separated from silicon powder in separator 126 are conducted through pipe 132 to a condenser 133 where any condensible materials are removed from the treating gas and are collected in receiver 134. The uncondensed hydrocarbon halide from condenser 119 may be returned to reactor 103 through conduit 135.

While we have shown and described particular embodiments of our invention, it will be obvious to those skilled in the art that changes and modifications may be made without departing from the invention in its broader aspects. We, therefore, aim in the appended claims to cover all such changes and modifications as fall within the true spirit and scope of the invention.

What we claim as new and desire to secure by Letters Patent of the United States is:

1. The method of preparing an organo-silicon compound which comprises introducing a powdered mixture of silicon and a metal catalyst into a hot reaction zone, and fluidizing the powder in the reaction zone with a hydrocarbon compound capable of reacting with the silicon to form an organo-silicon compound.

2. The method of preparing organo-silicon halides which comprises introducing a mixture of silicon powder and a powdered metal catalyst into a reaction zone maintained at an elevated temperature, fluidizing said powder mixture in said zone to a bulk density of from 3 to 40 pounds per cubic foot by means of a gaseous hydrocarbon halide, separating the reaction products of said hydrocarbon halide and silicon from the mixture of powdered metal catalyst and unreacted silicon powder, cooling the unreacted powder and returning the cooled powder to the reaction zone in a quantity sufficient to maintain said zone at the desired reaction temperatures.

3. The method of producing organo-silicon halides which comprises fluidizing a powdered mixture of silicon and a metal catalyst by means of a hydrocarbon halide, continuously passing said fluidized mixture through a reaction zone held at an elevated temperature sufficient to cause a reaction between the silicon component of said mixture and the hydrocarbon halide, separating the unreacted powder mixture from the products of reaction, cooling the separated powder and returning said cooled powder to the reaction zone in a quantity sufficient to absorb the heat of reaction evolved therein.

4. The method which comprises introducing a fluidized mixture of methyl chloride and a powdered mixture of copper and silicon into a reaction zone operating at a temperature of about 330–370° C., separating the reaction products and unreacted methyl chloride from the powdered mixture of copper and silicon, removing the separated powdered mixture of copper and silicon from the reaction zone, cooling the powdered mixture by contact with a liquid methylchlorosilane and returning the cooled powdered mixture to the reaction zone along with fresh methyl chloride.

5. The method which comprises passing a fluidized mixture of silicon and copper powder and a gaseous hydrocarbon halide upwardly through a restricted reaction zone maintained at elevated temperatures, separating the unreacted powder from the gaseous products of reaction, passing the separated powder downwardly through a restricted cooling zone, introducing into the powder passing through the cooling zone a gas compatible with the reaction between the silicon component thereof and the hydrocarbon halide, and returning the fluidized cooled powder to the reaction zone at a rate sufficient to maintain the powder in the reaction zone at the desired reaction temperatures.

6. The method which comprises maintaining a continuous circulation of a powdered mixture comprising silicon powder and a powdered metal catalyst in a closed path upwardly through a hot reaction zone and downwardly through a cooling zone by introducing sufficient methyl chloride into the powder as it enters the reaction zone to lower the bulk density thereof below the bulk density of the powder contained in the cooling zone, separating the reaction products and unreacted methyl chloride from the unreacted powder before said powder passes into the cooling zone and contacting said powder in the cooling zone with a liquid methylchlorosilane.

7. The method which comprises circulating a mixture of a powdered metal catalyst and silicon powder through a hot reaction zone and a cooling zone by fluid dynamic means, contacting the powder with a hydrocarbon halide in the reaction zone, purging a portion of the unreacted powder, gaseous reaction products and unreacted hydrocarbon halide from the reaction zone, separating the reaction products and hydrocarbon halide from the purged powder, circulating the separated powder through a second cooling zone and reaction zone and contacting fresh hydrocarbon halide therewith in said last mentioned reaction zone.

8. The method which comprises continuously circulating a fluidized powdered mixture of copper and silicon powder upwardly through a hot reaction zone and downwardly through a cooling zone, causing a hydrocarbon halide to react with the silicon component in the reaction zone, purging a portion of the unreacted powder, gaseous reaction products and unreacted hydrocarbon halide from the reaction zone and replacing the purged powder with fresh powder, separating the remaining unreacted hydrocarbon halide from the remaining gaseous reaction products, introducing a mixture of said unreacted hydrocarbon halide and fresh hydrocarbon halide into a second hot reaction zone, separating the purged powder from the purged reaction products and circulating said purged powder through a cooling zone and through said second reaction zone in contact with the mixture of unreacted hydrocarbon halide and fresh hydrocarbon halide.

9. The method of producing methyl silicon halides from a powdered silicon-copper mixture and methyl chloride which comprises passing methyl chloride upwardly through a mass of heated powdered silicon-copper mixture at a rate sufficient to fluidize the powder, removing a portion of the powder from said mass, cooling said portion and adding the cooled powder to the mass of heated powder at a rate sufficient to absorb the heat of reaction.

10. The method of preparing organo-silicon halides by reacting a hydrocarbon halide with powdered silicon-copper mixture which comprises passing a gaseous hydrocarbon halide upwardly through a mass of a hot powdered silicon-copper mixture in a reaction zone at a rate sufficient to fluidize the powder to a bulk density of from 3 to 40 pounds per cubic foot so as to maintain a flow of powder upwardly through said reaction zone at a velocity less than the velocity of the hydrocarbon halide, withdrawing hot powder from the upper part of the reaction zone and replacing the powder so withdrawn with relatively cool powder introduced into the lower part of the reaction zone.

11. The method which comprises circulating a fluidized mixture of powdered material comprising a powdered silicon and a powdered metal catalyst in a closed path, treating said powder in one portion of said cycle with a gas capable of increasing the reactivity of said material towards a hydrocarbon halide, withdrawing the treated powder from said cycle and introducing said powder along with a gaseous hydrocarbon halide into a hot reaction zone, separating the reaction products from the unreacted powder, cooling the unreacted powder, recirculating at least a portion of the cooled powder to the reaction zone, removing a portion of the cooled powder, treating said powder with a reactivating gas and returning the reactivated powder to the reaction zone.

CHARLES E. REED.
JEROME T. COE.